(12) United States Patent
Karner

(10) Patent No.: US 6,793,107 B2
(45) Date of Patent: Sep. 21, 2004

(54) STOWABLE COAT HANGER SUPPORT FOR A VEHICLE

(75) Inventor: Joseph Richard Karner, Sterling Heights, MI (US)

(73) Assignee: General Motors Corporation, Detroit, MI (US)

( * ) Notice: Subject to any disclaimer, the term of this patent is extended or adjusted under 35 U.S.C. 154(b) by 44 days.

(21) Appl. No.: 10/213,970

(22) Filed: Aug. 6, 2002

(65) Prior Publication Data

US 2004/0060953 A1 Apr. 1, 2004

(51) Int. Cl.$^7$ .................................................. B60K 7/10
(52) U.S. Cl. ..................................... 224/313; 296/1.07
(58) Field of Search ............................... 224/311, 313; 296/1.07, 214

(56) References Cited

U.S. PATENT DOCUMENTS

| | | | | |
|---|---|---|---|---|
| 3,554,417 A | * | 1/1971 | Yorty | .......................... 294/149 |
| 3,584,772 A | * | 6/1971 | Robertson | .................... 294/142 |
| 4,098,484 A | * | 7/1978 | Gray | ........................... 248/317 |
| 4,335,839 A | | 6/1982 | Kessler et al. | |
| 4,957,230 A | | 9/1990 | Gonzales | |
| 5,366,127 A | * | 11/1994 | Heinz | .......................... 224/313 |
| 5,598,956 A | * | 2/1997 | Schenberg | ...................... 223/1 |
| 5,676,284 A | * | 10/1997 | Schenberg | ..................... 223/1 |
| 6,003,918 A | * | 12/1999 | Hulyk | .......................... 294/149 |
| 6,340,104 B1 | | 1/2002 | Saylor | |

* cited by examiner

*Primary Examiner*—Stephen K. Cronin
(74) *Attorney, Agent, or Firm*—Laura C. Hargitt

(57) ABSTRACT

A stowable automotive coat hanger support for a vehicle roof has a support structure and an outer panel in assembled relationship and a headliner in affixed spaced relationship to the support structure. The coat hanger support is comprised of a fabric webbing loop which is connected to the support structure in the space between the support structure and the headliner. The webbing loop extends from the space to a coat-hanger-receiving position and is foldable to a collapsed stowed position against the headliner. A hook-and-loop fastener is used to retain the collapsed webbing loop against the headliner.

6 Claims, 2 Drawing Sheets

STOWABLE COAT HANGER SUPPORT FOR A VEHICLE

BACKGROUND OF THE INVENTION

1. Field of the Invention

This invention relates to coat hanger supports for installation in a vehicle.

2. Background Art

Trucks and automobiles have traditionally been equipped with interior coat hooks installed at the outer edges of the vehicle ceiling or headliner, generally in line with the fore-aft centers of the rear side doors. Such hooks are typically used to hang passenger garments by their collars or by special loops sewn into the garments. The hooks are also frequently used to support garments hung on coat hangers.

The advent of supplemental inflatable restraints (SIRs or airbags) installed above the headliner makes locating the traditional coat hooks difficult. The hooks tend to interfere with restraint packaging or deployment of the air bag. Alternative means to hang garments by the collar or on hangers in such environments characterize a problem which needs a solution.

SUMMARY OF THE INVENTION

This invention serves the primary purpose of supporting garments hanging on coat hangers. The support consists of a fabric webbing loop, a hook-and-loop or similar fastener and a mechanical fastener. The juxtaposed free ends of the webbing loop are secured to the vehicle roof structure by means of the mechanical fastener. The hook-and-loop fastener has one portion fastened to the fabric webbing loop and the other portion is fastened to the headliner or ceiling of the vehicle.

In use, the fabric webbing loop protrudes between the headliner and the door seal and forms a closed loop available to support coat hangers and other articles that incorporate a hook as a means of hanging garments. When not in use, the fabric webbing loop is secured by using the hook-and-loop fastener to collapse the loop against the headliner. In this out-of-the-way stowed position, the hanger support avoids any possible annoying interference with vehicle ingress and egress. It also provides a neat appearance for the interior of the vehicle.

Another important feature of this invention is that it allows the free deployment of an inflatable air restraint through the interface between the door seal and the headliner. The size and type of hook-and-loop fastener can be adjusted to ensure that the deployment of the air bag is unimpeded as it deploys from the concealed space between the headliner and the roof structure of the vehicle.

An opportunity for visual enhancement lies in the ability to decorate the fabric webbing loop using cloth, leather or other soft trim material.

This invention provides for the continuing ability to hang clothes hangers and other hooked supports from the traditional location in the rear door opening, regardless of the presence of a supplemental inflatable side restraint or airbag. It also offers the ability to stow the collapsed hanger support nearly flat against the headliner using a retaining system such as a hook-and-loop fastener.

There are alternative locations for the hanger support which would not interfere with the concealed inflatable restraint. For example, if the coat hook were located on the B-pillar, it could be too far forward and the hanging garment would interfere with the driver's or passenger's outboard shoulder and vision. With the coat hook located inboard of the door opening in the rear seat area, a hanging garment would interfere with an outboard rear seat passenger.

Accordingly, the invention is in the combination of a stowable coat hanger support with a vehicle roof. The vehicle top has a roof structure, a roof outer panel, a door seal, and a headliner in a fixed space relationship to the roof structure at the door seal. The improved coat hanger support of this invention has a webbing loop having an internal opening sufficiently large to receive the hanging portion of a coat hanger and a connector portion connected to the support structure in the space between the support structure and the headliner. The webbing loop of this invention extends out of the space between the support structure and the headliner and is openable to a coat-hanger-receiving position. The webbing loop is foldable from the coat-hanger-receiving position and is collapsible to a stowed position in an out-of-the-way position along the headliner. The combination of this invention also includes an inflatable air restraint in the concealed space between the roof structure and the headliner, and on the opposite side of the headliner from the webbing loop. The inflatable air restraint is deployable through an opening or slot formed between the door seal and the headliner. This is the same slot through which the coat hanger support may be connected to the roof structure of the vehicle.

DETAILED DESCRIPTION OF THE PREFERRED EMBODIMENT

Figure 1:
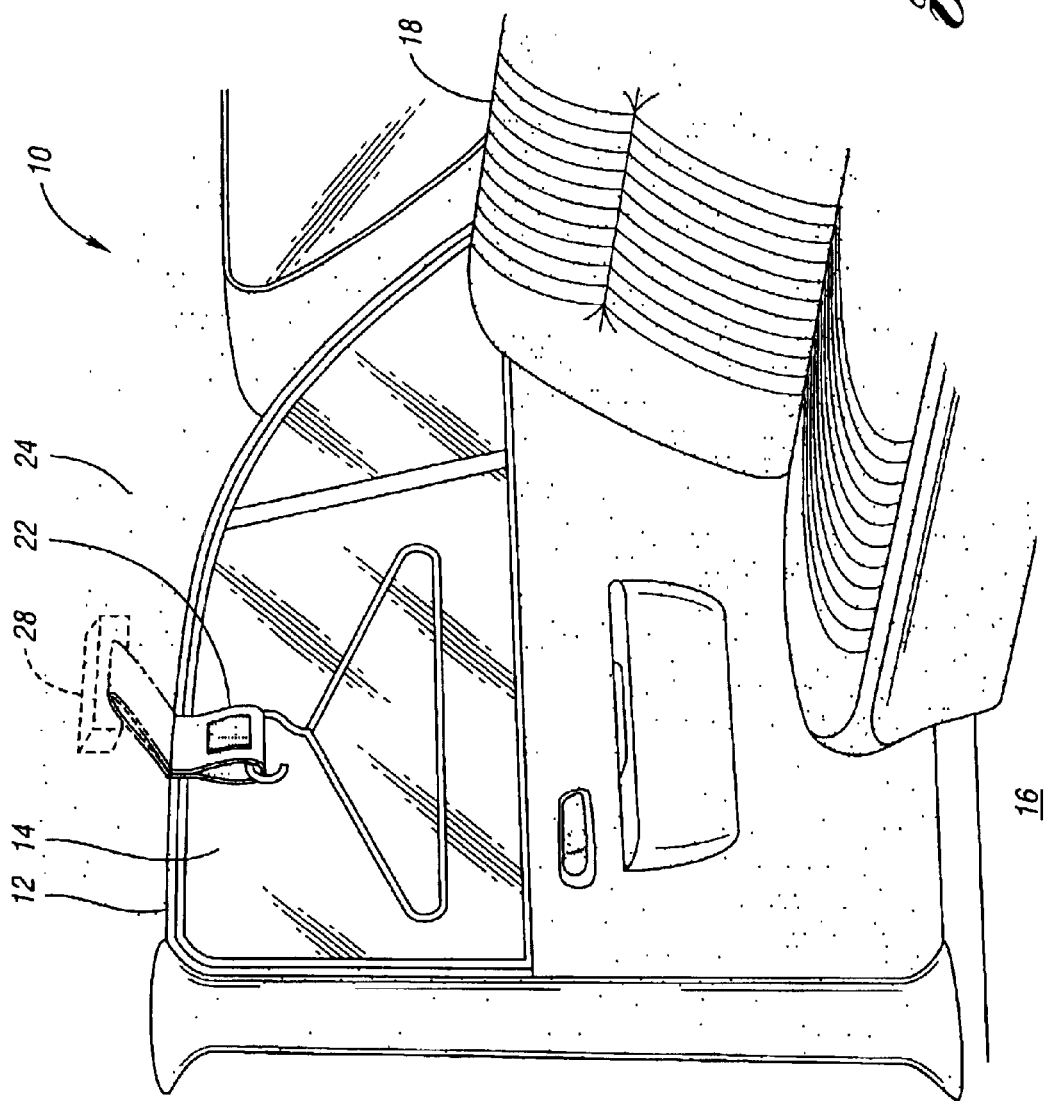
FIG. 1 is a fragmentary view of an automotive vehicle with parts broken away to show the stowable automotive coat hanger support of this invention.
Figure 2:
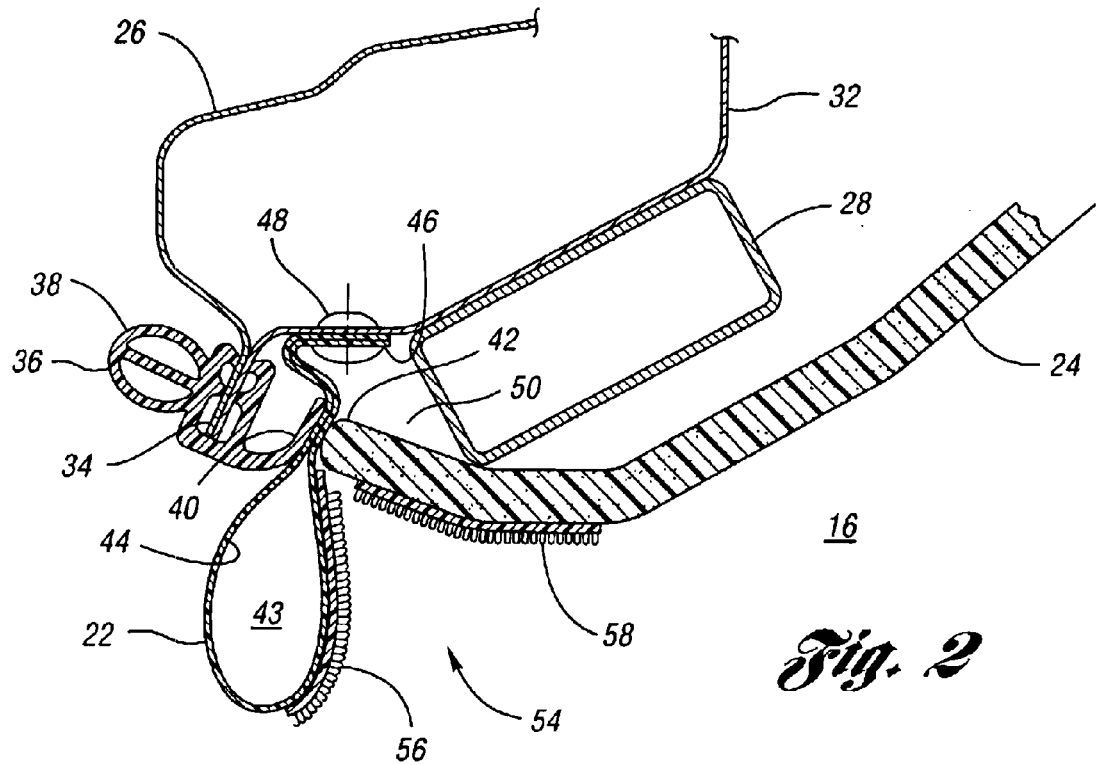
FIG. 2 is a fragmentary cross-section taken along line 2—2 in FIG. 1 to show the automotive coat hanger support in a deployed position.
Figure 3:
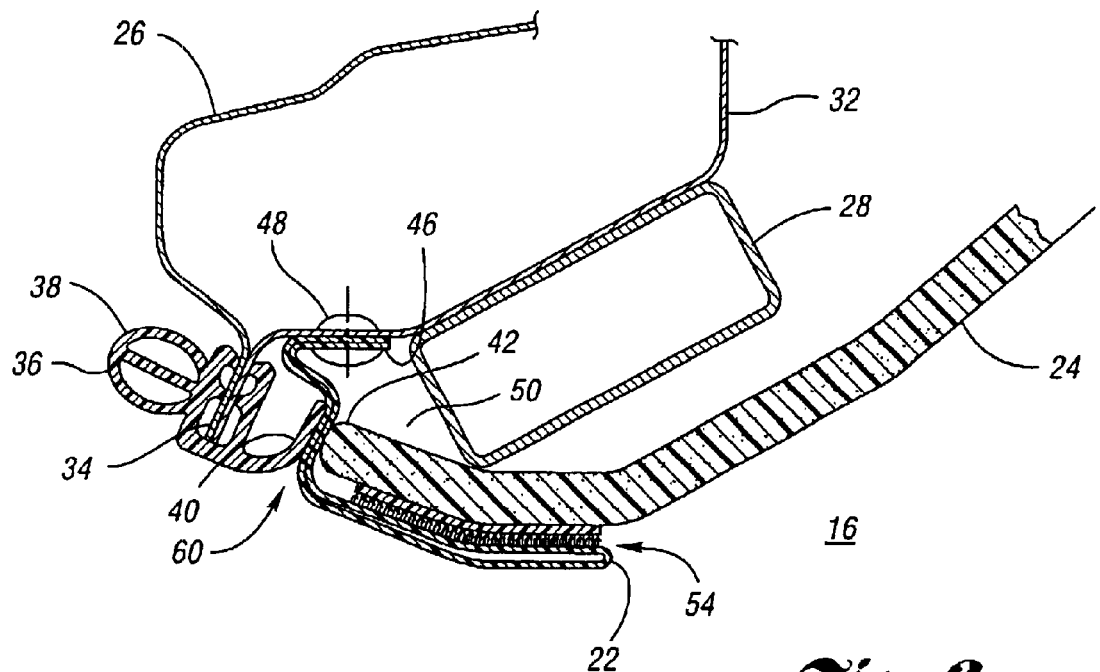
FIG. 3 is a fragmentary cross-sectional view similar to FIG. 2 with the automotive coat hanger support in a collapsed stowed position.

FIGS. 1–3 depict the interior of the rear seat area of a vehicle 10. The vehicle 10 has a rear door 12 having a window area 14 in the upper portion thereof. The rear interior 16 of the vehicle 10 has a rear seat 18. The vehicle 10 has a coat hanger support 22 extending beneath a headliner 24 and above the vehicle door 12. Outboard of the headliner 24 is the roof structure 32 and outer panel 26. The headliner 24 is spaced from the roof outer panel 26 in order to house an inflatable air restraint 28, shown in phantom in FIG. 1. An inflatable air restraint 28 is in the space between the support structure and the headliner adjacent the coat hanger support 22. The coat hanger support has a deployed position shown in FIG. 2 (solid line in FIG. 1) and a stowed position shown in FIG. 3 (phantom line in FIG. 1).

FIG. 2 shows the vehicle roof to be comprised of the roof outer panel 26 and an inner roof or support structure 32. The roof outer panel and inner roof structure of the roof are joined together to form a flange 34 which supports a door seal 36. The door seal includes a bulbous portion 38 for sealing a closed door and an inner edge or lip concealment portion 40 which lays adjacent a longitudinal side edge 42 of the headliner. When the door seal is connected to the flange 34, the concealment portion 40 biases the edge 42 of the headliner.

The coat hanger support 22 is comprised of a strip of fabric such as cloth, leather or other soft trim material. The strip is folded together to form an internal opening 43 by a webbing loop portion 44 and a juxtaposed attachment portion 46. The attachment portion is secured by any suitable fastener means 48 to the inner roof structure 32. The attachment portion of the strip is in a concealed area or space 50 between the roof structure and the headliner which is concealed from the interior 16 of the vehicle. Thus, the coat hanger support 22 is secured or attached in the same area 50 which houses the inflatable air restraint 28. Accordingly, the loop portion is openable and collapsible. It is openable to a coat-hanger-receiving position (FIG. 2) to receive the hanging portion of a coat hanger and collapsible to a stowed position (FIG. 3) to provide improved ingress and egress from the vehicle when the hanging portion of the hanger is not being received. Moreover, the loop portion 44 of the coat hanger support extends from the concealed area 50 between the seal portion 40 and the edge portion 42 of the headliner to a deployed coat-hanger-receiving position in the rear interior 16 of the vehicle. The loop 44 of the coat hanger support 22 is sufficiently large to receive the hanging or hook portion of a coat hanger. The bias of the edge 40 of the door seal is sufficiently strong in the direction of the headliner edge 42 to conceal any gap by embracing the webbing loop where the loop of fabric extends from the concealed space 50 along the edge 42 of the headliner.

FIG. 2 also shows a hook-and-loop fastening means 54 which includes a hook portion 56 attached to the coat hanger support 22 and a loop portion 58 secured to the underside of the headliner 24. The positioning of the portions of this type of fastening means could be reversed and the fastener could be otherwise configured, such as a snap fastener or the like.

The stowed position for the fabric webbing loop 22 is shown in FIG. 3. The loop is collapsed and held to the underside of the headliner 24 by the hook-and-loop fastener 54. This attachment of the loop to the headliner prevents the possible annoying interference with vehicle ingress and egress. It also provides a neat appearance for the interior of the vehicle.

An important feature of this invention is that it allows the free deployment of the inflatable air restraint 28 through the interface 60 between the door seal and the headliner. The size, shape, and type of fastener are selectable to ensure the unimpeded deployment of the air restraint 28.

Although the description of this invention has been given with reference to a particular embodiment, it is not to be construed in the limiting sense. Many variations and modifications will now occur to those skilled in the art. For a definition of the invention, reference is made to the appended claims.

What is claimed is:

1. In combination with a vehicle having a roof structure, a roof outer panel, and a headliner in spaced relationship to the roof structure, an improved coat hanger support comprising:

a webbing loop having an internal opening sufficiently large to receive the hanging portion of a coat hanger and an attachment portion connected to the roof structure in the space between the roof structure and the headliner;

the webbing loop extending out of such space and being openable to a coat-hanger-receiving position; and the webbing loop being collapsible from the coat-hanger-receiving position to a stowed position along the headliner.

2. The coat hanger support combination of claim 1, including a fastener to secure the webbing loop to the headliner when the webbing loop is collapsed.

3. The coat hanger support combination of claim 1 including a hook-and-loop fastener between the webbing loop and the headliner when the webbing loop is collapsed.

4. The coat hanger support combination of claim 1 including an inflatable air restraint in the space between the roof structure and the headliner adjacent the webbing loop.

5. The coat hanger support combination of claim 1 wherein the roof structure and the roof outer panel are joined together by a flange adjacent the attachment portion of the webbing loop, and including a door seal connected to the flange and having a concealment portion biasingly embracing the webbing loop where the webbing loop extends out of the space between the roof structure and the headliner.

6. In combination with a vehicle having a roof structure, a roof outer panel, and a headliner in spaced relationship to the roof structure, an improved coat hanger support comprising:

a webbing loop having an internal opening sufficiently large to receive the hanging portion of a coat hanger and an attachment portion connected to the roof structure in the space between the roof structure and the headliner;

the webbing loop extending out of such space and being openable to a coat-hanger-receiving position;

the webbing loop being collapsible from the coat-hanger-receiving position to a stowed position along the headliner;

a hook-and-loop fastener between the webbing loop and the headliner when the webbing loop is collapsed;

an inflatable air restraint in the space between the roof structure and the headliner adjacent the webbing loop; and wherein the roof structure and the roof outer panel are joined together by a flange adjacent the attachment portion of the webbing loop, and including a door seal connected to the flange and having a concealment portion biasingly embracing the webbing loop where the webbing loop extends out of the space between the roof structure and the headliner.

* * * * *